United States Patent [19]
van der Lely

[11] 4,132,274

[45] Jan. 2, 1979

[54] SOIL CULTIVATING IMPLEMENTS

[76] Inventor: Cornelis van der Lely, 7, Brüschenrain, Zug, Switzerland

[21] Appl. No.: 722,509

[22] Filed: Sep. 13, 1976

[30] Foreign Application Priority Data

Sep. 12, 1975 [NL] Netherlands ............... 7510740

[51] Int. Cl.² .................. A01B 33/06; A01B 35/06
[52] U.S. Cl. .......................... 172/59; 172/70; 172/766
[58] Field of Search ............. 172/59, 70, 63, 68, 172/111, 523, 526, 524, 73, 766, 768

[56] References Cited

U.S. PATENT DOCUMENTS

| | | | |
|---|---|---|---|
| 643,465 | 2/1900 | Callender | 172/766 |
| 940,501 | 11/1909 | Bowman | 172/63 X |
| 1,217,245 | 2/1917 | Tyson | 172/350 |
| 1,360,868 | 11/1920 | Beise | 172/59 |
| 1,450,503 | 4/1923 | Keller | 172/63 |
| 2,702,447 | 2/1955 | Cook | 172/768 X |
| 3,667,551 | 6/1972 | Lely | 172/59 |
| 3,946,816 | 3/1976 | Lely et al. | 172/59 |
| 4,003,437 | 1/1977 | Lely | 172/59 |

FOREIGN PATENT DOCUMENTS

| | | | |
|---|---|---|---|
| 65582 | 11/1914 | Austria | 172/63 |
| 565501 | 8/1975 | Switzerland | 172/63 |

*Primary Examiner*—Richard J. Johnson
*Attorney, Agent, or Firm*—Mason, Mason & Albright

[57] ABSTRACT

An implement has rotary soil-working cultivating members with tines that are arranged to work a broad path of soil. The cultivating members are rotated about upwardly extending axes by a drive from a p.t.o. and are positioned adjacent one another. A beamed support at the front of the implement frame has soil arresting elements fastened to the support and the elements can be tines, strips or the like that extend horizontally above the tines and below the main frame portion to free ends. The elements are positioned to arrest the lateral and/or forward displacement of soil thrown by the cultivating members. Soil crumbling members can also be attached to the frame portion in front of and between neighboring cultivating members. A supporting roller having a periphery formed by elongated rods is positioned to the rear of the cultivating members.

11 Claims, 8 Drawing Figures

SOIL CULTIVATING IMPLEMENTS

For a better understanding of the invention, and to show how the same may be carried into effect, reference will now be made, by way of example, to the accompanying drawings, in which.

Figure 1:
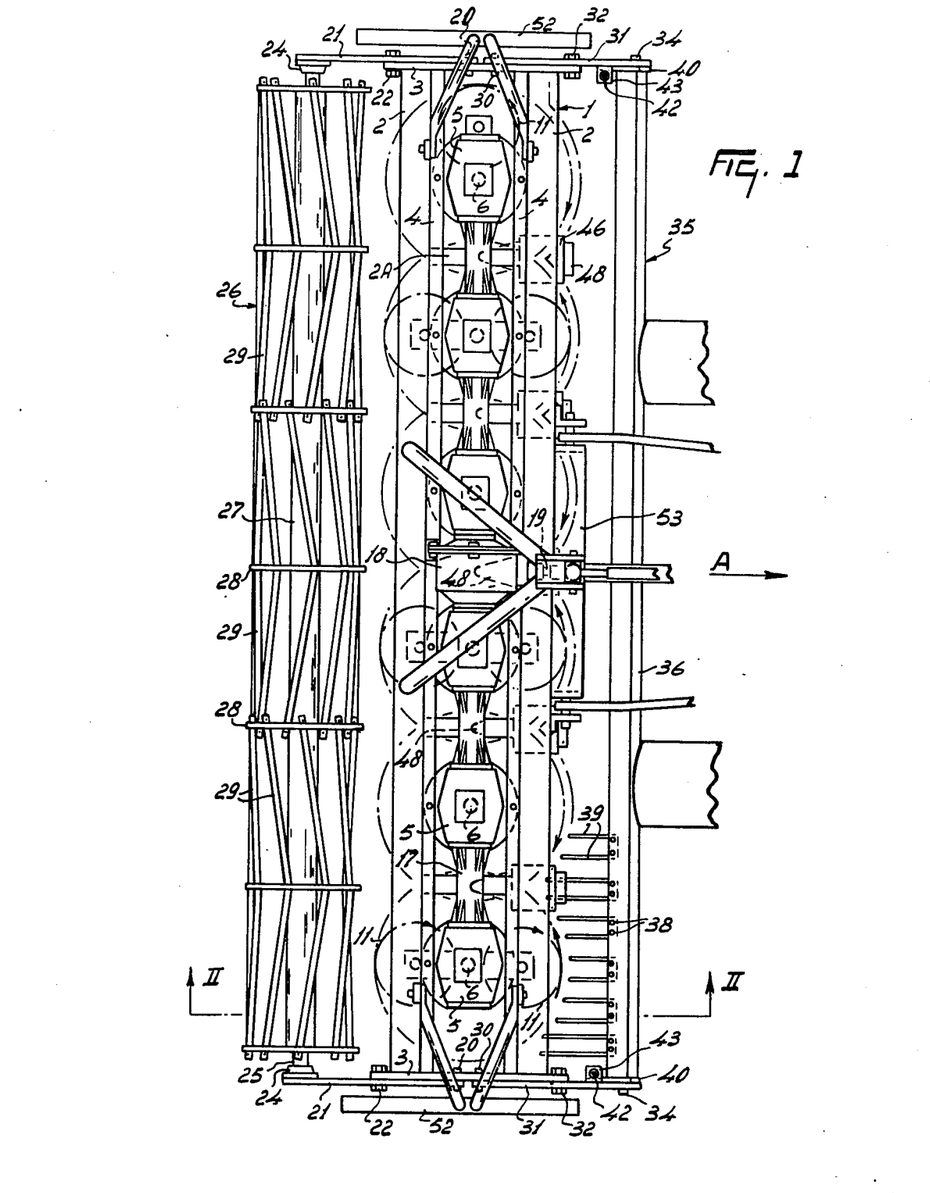
FIG. 1 is a plan view of a soil cultivating implement in accordance with the invention connected to the rear of an agricultural tractor.
Figures 2, 3:
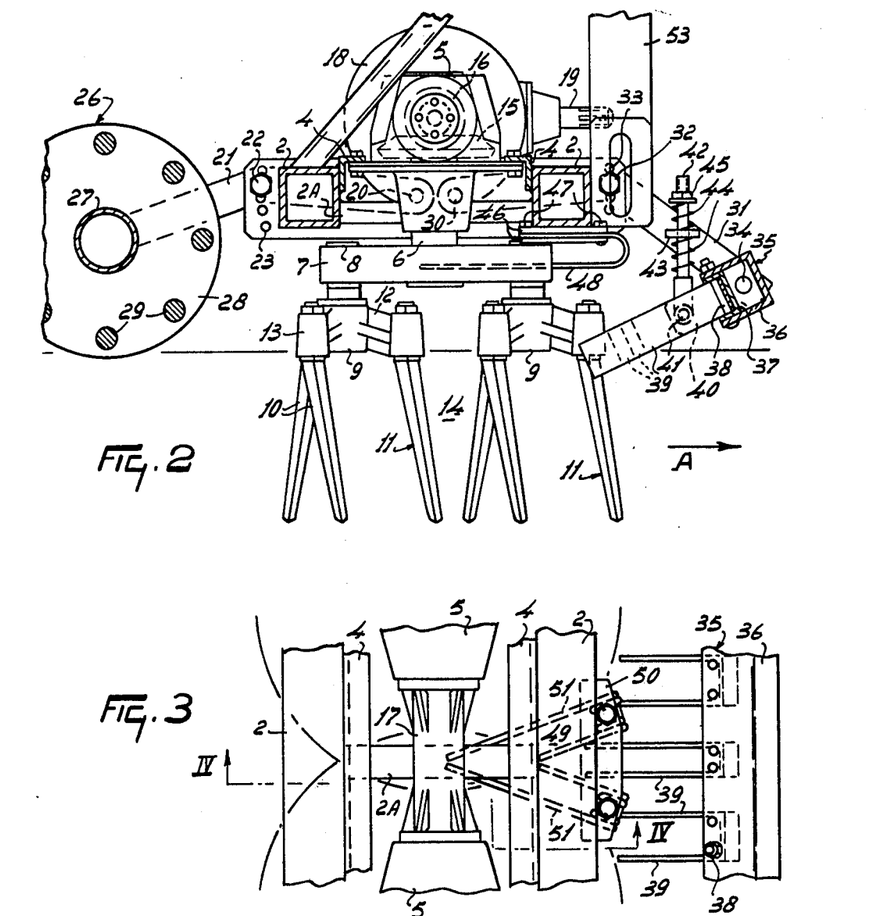
FIG. 2 is a section, to an enlarged scale, taken on the line II—II in FIG. 1.
FIG. 3 is a plan view, to an enlarged scale as compared with FIG. 1, of part of an implement that is similar in most respects to the implement of FIGS. 1 and 2 but which incorporates alternative members.

Referring to FIGS. 1 and 2 of the accompanying drawings, the soil cultivating implement that is illustrated therein has a supporting frame that is generally indicated by the reference 1, said frame including a pair of parallel and substantially horizontally disposed beams 2, said beams 2 being spaced apart from one another in the intended direction of operative travel of the implement which is indicated by an arrow A with both of them extending transverse, and usually substantially perpendicular, to the direction A. Each of the frame beams 2 is of hollow construction and has a polygonal cross-section which it is preferred should be square as can be seen in FIG. 2 of the drawings. Each beam 2 is arranged so that, with the preferred square cross-section or any other polygonal cross-section, at least one flat side thereof is horizontally or substantially horizontally disposed. The ends of the beams 2 are interconnected by substantially vertically disposed side plates 3 of the supporting frame 1, said side plates 3 being substantially parallel to one another and to the direction A and being dimensioned so that both of them project both forwardly beyond, and rearwardly behind, the two frame beams 2 with respect to the direction A. A number, such as four, of strengthening strips 2A extend substantially horizontally parallel to the direction A in interconnecting relationship with the two frame beams 2. Bars 4 of L-shaped cross-section are secured to the two upright sides of the two square cross-section frame beams 2 that face one another, the permanent connections being effected by welding with the bars 4 located close to the tops of the two beams 2. Each bar 4 has its substantially vertical limb welded to the upright side of the corresponding beam 2 in such a way that the substantially horizontal limb thereof projects from the substantially vertical limb towards the other bar 4. As can be seen in FIG. 2 of the drawings, this arrangement disposes the two substantially horizontal limbs of the two bars 4 at a level just above that of the tops of the two beams 2 and in regularly spaced apart relationship, throughout their lengths, between said beams 2.

Six gear boxes 5 are secured by substantially vertical bolts to the substantially horizontal limbs of the bars 4 in such a way that said six gear boxes 5 extend in a row in substantially regularly spaced apart relationship in a substantially horizontal direction that is perpendicular to the direction A, the spacings between the two end gear boxes 5 of the row and the corresponding adjacent side plates 3 of the supporting frame 1 being substantially the same as is the distance between any two immediately neighbouring gear boxes 5 in the row (see FIG. 1). Each gear box 5 rotatably supports a corresponding upwardly extending shaft 6 whose longitudinal axis (axis of rotation) will usually be vertically or substantially vertically disposed. The lowermost ends of the six shafts 6 project downwardly from beneath the bottoms of the six gear boxes 5 and are there externally splined for co-operation with hubs at the centers of supports 7, said hubs being internally splined to match the splines on the shafts 6. Axial disengagement of the supports 7 from the shafts 6 is prevented by the provision of washers (not shown) and nuts (not shown) the latter co-operating with screwthreads on short downward extensions (not shown) of the shafts 6. Each support 7 comprises two axially aligned arms that extend radially away from the corresponding hub in diametrically opposite directions, said arms being provided at, or very near to, their free ends with stub shafts 8 that are in parallel or substantially parallel relationship with the corresponding shafts 6.

Each stub shaft 8 projects downwardly from beneath the bottom of the corresponding support 7, the downwardly projecting portion having the hub 9 of a corresponding cultivating tool that is generally indicated by the reference 11 mounted thereon in a freely rotatable manner. Each hub 9 is located at the center of a corresponding support 12 which comprises three arms that project outwardly away from the hub 9 at 120° intervals around the longitudinal axis (axis of rotation) of that hub. As can be seen in FIG. 2 of the drawings, each arm of each support 12 is not strictly radially disposed with respect to the longitudinal axis of the corresponding hub 9 but is inclined obliquely downwardly towards the ground surface from the hub 9 concerned towards its outermost end. The outermost end of each arm of each support 12 has a corresponding tine holder 13 rigidly secured to it, said tine holders 13 being of sleeve-like formation and upwardly tapering substantially frusto-conical configuration. It will be appreciated that each cultivating tool 11 comprises three of the tine holders 13 and it will be seen from the drawings that each tine holder 13 firmly but releasably receives an upper fastening portion of a corresponding rigid soil working tine 10.

The interior of each tine holder 13 is preferably of square cross-section and, with this preferred cross-section, the fastening portion of each tine 10 has a matching cross-section with the exception of a short screwthreaded uppermost part thereof that is arranged for co-operation with a corresponding fastening nut (see FIG. 2). Once the fastening portions of the tines 10 have been entered upwardly into the holders 13 and the fastening nuts have been applied to said screwthreaded parts and subsequently tightened, the tines 10 cannot turn about the longitudinal axes of their fastening portions relative to the holders 13. The internal bores of the holders 13 and the parts of the tine fastening portions that co-operate therewith are, like the external profiles of the holders 13, of upwardly tapering configuration. The fastening portion of each tine 10 is integrally connected to a soil working portion of that tine in such a way that the longitudinal axes of the two straight portions are inclined to one another, at the integral junction between them, by an angle of not less than substantially 15°. The soil working portion of each tine 10 is of square or at least rectangular cross-section, as illustrated, or has some other polygonal cross-section and it tapers gently in a downward direction towards its lowermost free end or tip from its integral junction with the corresponding fastening portion. With the substantially square cross-section of each soil working portion and of the corresponding fastening portion (except the uppermost screwthreaded part thereof) that has been described, each tine 10 can be set in any one of four different angular positions around the longitudinal axis of the corresponding holder 13. Clearly, all that is required to bring one of the tines 10 from one such angular setting to one of the other possible settings, is to release the co-operating nut, draw the fastening portion downwardly until it is clear of the interior of the co-operating holder 13, turn the tine through the required angle of 90° or 180° about the longitudinal axis of its fastening portion, enter the fastening portion upwardly in the new setting into the co-operating holder 13, and finally replace the retaining nut. It will be appreciated that the ability to re-position the tines 10 of each cultivating tool 11 enables the widths of the strips of soil that are worked by the three tines 10 of each tool 11, during operation of the implement, to be varied. Clearly, by giving the fastening portions of the tines 10 and the co-operating interiors of the holders 13 other matching polygonal cross-section, numbers of angular settings, other than four, of the tines 10 could readily be provided. In the angular positions of the tines 10 that are illustrated in FIGS. 1 and 2 of the drawings, the obliquely downwardly directed soil working portions of those tines are inclined rearwardly from top to bottom so as to trail with respect to the directions of rotation about the axes of the stub shafts 8 which the tools 11 will normally follow during operation of the implement. These directions of rotation are indicated by small arrows in FIG. 1 of the drawings in respect of the pair of tools 11 that is at the foot of that Figure and in respect of the tool 11 which is uppermost in the same Figure.

Each shaft 6, the corresponding support 7 and the corresponding pair of freely rotatable tined cultivating tools 11 affords a soil working or cultivating member that is generally indicated by the reference 14, there thus being six of the soil working or cultivating members 14 that are mechanically driven to revolve about the axes of the corresponding shafts 6 during the operation of the implement. It will be noted that, in the embodiment which is being described, the distance between the longitudinal axes of the two stub shafts 8 of each member 14 is substantially 35 centimeters so that the substantially parallel axes of rotation of the two tools 11 of each member 14 are spaced apart from one another by that distance. The downwardly directed soil working portions of the tines 10 are of straight configuration and, when the fastening portions of the three tines 10 of each tool 11 are disposed in the angular settings in their holders 13 that are illustrated in FIGS. 1 and 2 of the drawings, the soil working portions of those three tines 10 work a strip of soil having a width of substantially 20 centimeters, said strip extending lengthwise in the direction A.

Each shaft 6 is provided, inside the corresponding gear box 5, with a crown wheel or bevel pinion 15 whose teeth are in driven mesh with those of a smaller bevel pinion 16 mounted on a substantially horizontal driving shaft that extends through the gear boxes 5 and through tubular connecting members 17, arranged between the successive gear boxes 5, in a direction that is perpendicular to the direction A. It will be noted that the bevel pinions 16 are arranged on said driving shaft for co-operation with the crown wheels or bevel pinions 15 in such a way that, when the implement is in use, each shaft 6 and the corresponding soil working or cultivating member 14 will revolve in a direction that is opposite to the direction of rotation of the immediately neighbouring shaft 6 and member 14 in the single row thereof or to the directions of rotation of both the neighbouring pairs of those units in that row. In this connection, reference is directed to the arrows that appear in FIG. 1 of the drawings to indicate the intended directions of operative rotation of the shafts 6 and the members 14 that are fastened to those shafts. The longitudinal axes (axes of rotation) of the successive shafts 6, and thus of the successive members 14, are spaced apart from one another by distances of substantially 50 centimeters in the embodiment that is illustrated in FIGS. 1 and 2 of the drawings. In fact, the substantially horizontal driving shaft that is substantially perpendicular to the direction A is not a single unit but is provided in at least three sections. It will be noted from FIG. 1 that a central gear box 18 interconnects the two innermost gear boxes 5 of the row of six gear boxes 5 in place of one of the tubular connecting members 17 and has the same longitudinal extent in a horizontal direction that is perpendicular to the direction A as does each of said connecting members 17. At least one innermost section of the substantially horizontal driving shaft that has just been mentioned is rotatably mounted in the central gear box 18 and projects from opposite sides of that gear box into the two immediately neighbouring gear boxes 5. The opposite ends thereof are coaxially connected, in a manner which it is not necessary to describe nor illustrate for the purposes of the present invention, to two outer sections of the substantially horizontal driving shaft which transmit drive to the three shafts 6 that lie at opposite sides of the central gear box 18 when the implement is viewed in plan (FIG. 1). Depending upon the internal construction of the central gear box 18, the central section of the substantially horizontal driving shaft may be a single section or two separate but coaxial sections. In either case, the central gear box 18 has a rotary input shaft 19 that projects substantially horizontally forwardly from the front thereof in substantially the direction A, the leading end of said shaft 19 being splined or otherwise keyed to enable it to be placed in driven connection with the power take-off shaft of an agricultural tractor or other operating vehicle by way of an intermediate telescopic transmission shaft, that is of a construction which is known per se, having universal joints at its opposite ends. The rotary input shaft 19 is provided, inside the central gear box 18, with a bevel pinion whose teeth are in driving mesh with one or two larger bevel pinions mounted on the central section or sections of the substantially horizontal driving shaft that extends substantially perpendicular to the direction A. It is, in fact preferred to provide the central section of that shaft as two separate but coaxial units in which case the bevel pinion carried by the rotary input shaft 19 co-operates with two bevel pinions each one of which is mounted on a corresponding one of the two co-axial units of said central section.

Substantially horizontally aligned stub shafts 20 are provided in central regions of the two side plates 3 and corresponding arms 21 are turnable upwardly and downwardly about those stub shafts 20 alongside the outer surfaces of the two side plates 3. The arms 21 extend rearwardly from the stub shafts 20 with respect to the direction A and project rearwardly beyond the side plates 3. Rear edge regions of the two side plates 3 are formed with curved rows of holes 23 in which each hole 23 is at the same distance from the axis defined by the two stub shafts 20. Each arm 21 is formed with a single hole at the same distance from said axis and that hole can be brought into register with any chosen one of the corresponding row of holes 23 by turning the arm 21 concerned to an appropriate angular position about the stub shaft 20 upon which it is mounted. Bolts 22 are provided for horizontal entry through the single holes in the arms 21 and through chosen holes 23 to fix the arms 21 releasably in corresponding angular settings about said axis. The rearmost ends of the arms 21 with respect to the direction A are provided with substantially horizontally aligned bearings 24 which receive horizontal stub shafts 25 at the opposite ends of a rotatable supporting member in the form of a ground roller 26. The roller 26 comprises a central axially disposed tubular support 27 to which seven substantially circular support plates 28 are secured at regularly spaced apart intervals with two of said plates 28 located at the opposite ends of the support 27. The seven support plates 28 are all substantially vertically disposed in parallel relationship with one another and substantially parallel relationship with the direction A. Each of the support plates 28 is formed close to its circumference with a number of holes that are regularly spaced apart from one another around the longitudinal axis of the central tubular support 27. In the case of each of the first, second, fourth, sixth and seventh of said plates 28 counting from either end of the roller, there are eight of said holes that are spaced apart from one another at regular 45° intervals around said axis while, in the case of each of the third and fifth plates 28 counting from either end of the roller 26, there are sixteen of said holes that are spaced apart from one another at regular 22½° intervals around the longitudinal axis of the support 27.

Three groups of elongated elements 29 of rod-like formation are entered through the various holes that are close to the peripheries of the support plates 28 and it will be seen from FIG. 1 of the drawings that, considered in a direction parallel to the longitudinal axis of the central support 27 of the roller 26, each element 29 has a length which is a little in excess of the distance between one of the support plates 28 and the plate 28 that is next but one along the roller 26 therefrom. Each element 29 is entered with some clearance through the holes in the three plates 28 with which it co-operates and transverse pins are entered through bores formed very close to its opposite ends to prevent unwanted axial disengagement of each element 29 from the corresponding plates 28. It can be seen from FIG. 1 of the drawings that the three groups of elements 29 are arranged in immediately succeeding relationship along the length of the roller 26 with said groups successively overlapping at the third and fifth plates 28 counting from either end of the roller 26. It will be remembered that it is these plates that are each formed with sixteen, rather than eight, peripheral holes, said sixteen holes alternately receiving the ends of the eight elements 29 of each of the two groups of those elements that overlap at the plate 28 concerned. It will also be noted from FIG. 1 of the drawings that each element 29 is formed at substantially its midpoint with a sharp angular bend or "kink", said bends or kinks thus registering with the peripheral holes in the second, fourth and sixth support plates 28 counting from either end of the roller 26 and said elements 29 being so disposed that the angular point which is defined by each bend or kink is orientated rearwardly with respect to the direction A when said bend or kink is in contact with, or very close to, the ground surface during the operation of the implement. Moreover, each group of eight bends or kinks and the support plate 28 with which they correspond is contained in a corresponding substantially vertical plane that is substantially parallel to the direction A and which passes midway between the axes of rotation of the shafts 6 of two co-operating rotary soil working or cultivating members 14. "Co-operating" means that the directions of positive rotation of the two members 14 concerned are such that parts of those members move rearwardly with respect to the direction A when in the proximity of the planes that have just been defined, reference being made to the arrows shown in FIG. 1 of the drawings that denote the directions of operative rotation of the members 14 about the longitudinal axes of the corresponding shafts 6.

In addition to the stub shafts 20, the central regions of the two side plates 3 also carry substantially horizontally aligned stub shafts 30 that are quite close to the stub shafts 20 but that are located forwardly therefrom with respect to the direction A. Arms 31 are turnable upwardly and downwardly about the stub shafts 30 alongside the outer surfaces of the side plates 3, said arms 31 extending forwardly to locations beyond the leading edges of the side plates 3 with respect to the direction A, the leading ends of said arms 31 being inclined downwardly (see FIG. 2). Curved rows of holes 33 are formed close to the leading edges of the side plates 3 with each hole 33 at the same distance from the axis defined by the aligned stub shafts 30. The arms 31 are formed with single holes that are at the same distance from said axis and bolts 32 are provided for horizontal entry through the single holes in the arms 31 and chosen holes 33 to secure the arms 31 releasably in corresponding angular positions about the substantially horizontal axis defined by the stub shafts 30.

It will be evident from FIG. 1 of the drawings that the arms 31 extend horizontally, or substantially horizontally, forwardly from the stub shafts 30 to locations that substantially coincide with the single holes therein that are arranged to co-operate with the bolts 32 whereafter the aforementioned downwardly and forwardly inclined leading ends thereof, commence, said leading ends being of rectilinear configuration. Substantially horizontally aligned stub shafts 34 are carried near to the lowermost leading extremities of the end portions of the arms 31 and a support 35 is pivotally mounted between the two stub shafts 34 so as to be turnable about its own substantially horizontally extending longitudinal axis. The support 35 comprises a beam 36 of channel-shaped cross-section between the limbs of which a second beam 37 of channel-shaped cross-section is arranged, the second beam 37 having shorter limbs than the beam 36 and being arranged so that, as seen in cross-section (FIG. 2), the edges of the limbs of the second beam 37 lie alongside those of the limbs of the first beam 36 in mutually registering relationship. The four limbs of the two beams 36 and 37 are interconnected at substantially regular intervals along the support 35 by pairs of bolts 38. In addition to interconnecting the limbs of the beams 36 and 37, each pair of bolts 38 also secures a corresponding pair of elongated elements 39 between the limbs of the second beam 37. The elongated elements 39 are in the form of rectangularly shaped spring steel strips and are made in integral pairs with the junctions between the two elements 39 of each pair being the parts thereof that lie between the limbs of the second beam 37 where they are retained by the corresponding pairs of bolts 38. It can be seen from the drawings that the elongated elements 39 are not all of the same length and the reason for this will be discussed below. Each element 39 has a substantially rectangular free end and it will be seen from the drawings that the elements 39 are inclined downwardly and rearwardly with respect to the direction A from the support 35 in such a way that their free ends are located close (as seen in plan view FIG. 1) to the circular paths that are traced by the tines 10 of the cultivating tools 11 of the successive soil working or cultivating members 14 during the positive rotation of those members about the axes of the shafts 6. Thus, those elements 39 that are disposed substantially directly in register with the shafts 6 in the direction A are the shortest while those that are located in register with positions midway between the pairs of shafts 6 are the longest, the other elements 39 being of progressively differing intermediate lengths. A careful study of FIG. 1 of the drawings will also show that those elements 39 of each pair that are longest and substantially in register in the direction A with locations midway between two of the shafts 6 are closer to one another than are the two elements 39 of each pair that are substantially in register in the direction A with one of the shafts 6, the latter elements being shorter. This arrangement enables the longest elements 39 to extend rearwardly from the support 35 for a greater distance than would be possible if the two elements 39 of each longer pair were spaced apart from one another by the same distance as the two elements 39 of each shorter pair.

The opposite ends of the support 35 are provided, adjacent the stub shafts 34, with forwardly and downwardly projecting lugs 40 to which the lowermost ends of corresponding upright rods 42 are turnably connected by horizontal pivot pins 41. The rods 42 extend upwardly from their pivotal connections to the lugs through holes in brackets 43 that are secured to the arms 31. The uppermost end of each rod 42 is screwthreaded and carries a corresponding axially displaceable nut 45 and co-operating washer. Two helical compression springs 44 are wound around each rod 42, one spring 44 bearing between the upper surface of the corresponding bracket 43 and the lower surface of the washer that co-operates with the corresponding nut 45 and the other spring 44 bearing between the lower surface of the corresponding bracket 43 and an enlargement at the lower end of the rod which forms part of the pivotal connection of that rod to the corresponding lug 40 by way of the corresponding pin 41. With this arrangement, the support 35 and the elongated elements 39 will tend to occupy a substantially fixed angular position about the axis defined by the stub shafts 34 relative to the arms 31 but upward or downward pivotal movements about said axis are readily possible, away from the substantially fixed position, against the action of either the upper springs 44 or the lower springs 44. The substantially fixed angular position can be adjusted, as may be required, by moving the nuts 45 upwardly or downwardly along the screwthreaded upper ends of the rods 42.

Soil crumbling members 48 are connected to the leading frame beam 2 of the supporting frame 1 by clamping plates 46 and bolts 47 at locations which, as seen in plan view (FIG. 1), are midway between planes that contain the longitudinal axes of the shafts 6 and that are all parallel to the direction A. Each soil crumbling member 48 is in the form of a spring steel strip of substantially U-shaped configuration when seen in side elevation (FIG. 2), the limbs of the "U" being of dissimilar lengths. Each soil crumbling member 48 has an effective portion (i.e. that part thereof that is not clamped to the leading frame beam 2) which initially projects forwardly with respect to the direction A from the corresponding clamping plates 46 for a short distance whereafter it is bent downwardly and rearwardly through substantially 180° to terminate in a much longer substantially flat and substantially horizontally disposed portion that is located immediately above the level of the tops of the cultivating tools 11. As seen in side elevation (FIG. 2), the rearmost end of the lower and longer portion of each soil crumbling member 48 that has just been discussed is substantially in register with a plane containing the axes of rotation of the six shafts 6, said rearmost ends being tapered to rounded points (see FIG. 1). It is noted that the width of the spring steel strip which affords each soil crumbling member 48 is substantially the same as the maximum width of the region of overlap between the circular paths that are traced by the outermost extremities of two immediately neighbouring soil working or cultivating members 14 of the implement during its operation (see FIG. 1).

Two shield plates 52 that are usually substantially vertically disposed are arranged near the side plates 3 of the supporting frame 1 immediately beyond the opposite ends of the row of six rotary soil working or cultivating members 14. The upper edge of each shield plate 52 is connected by a corresponding pair of arms to substantially horizontally aligned pivots which define axes that are substantially parallel to the direction A, said pivots being mounted on top of the frame beams 2 at short distances inwardly from the ends of those beams. The lower edges of the shield plates 52 are shaped to slide over the ground surface in the direction A during operation of the implement and the fact that said plates 52 are turnable upwardly and downwardly about the axes which are defined by the corresponding pairs of pivots enables said plates to match any undulations in the surface of the ground that may be met with during operation. The shield plates 52 minimise ridging at the opposite edges of the broad strip of soil that is worked by the implement and greatly reduce the number of stones and like potentially dangerous objects that are flung laterally of the path of travel by its rotating soil working or cultivating members 14.

Figure 4:
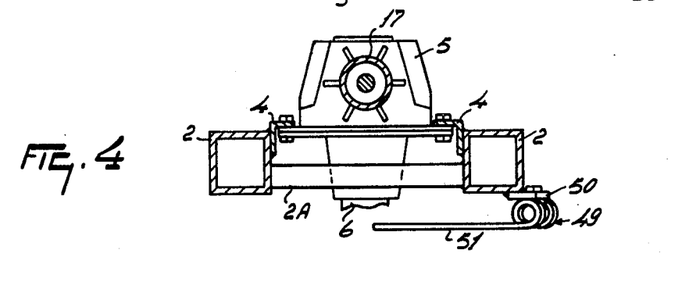
FIG. 4 is a section taken on the line IV—IV in FIG. 3.

FIGS. 3 and 4 of the drawings illustrate a construction in which the soil crumbling members 48 of FIGS. 1 and 2 are replaced by soil crumbling members 49 in the form of two integral pairs of spring steel or other resilient tines 51. The two pairs of tines 51 of each soil crumbling member 49 are secured by upright bolts to a corresponding horizontally disposed support plate 50 that is welded to the bottom of the leading frame beam 2 of the supporting frame 1 so as to project forwardly therefrom with respect to the direction A. The two tines 51 of each pair are formed integrally from spring steel or other resilient material of circular cross-section and are of dissimilar lengths, the outermost (at their root ends) two tines 51 of each soil crumbling member 49 being the longer. The inner two tines 51 of each member 49 have approximately half the lengths of the outermost two tines 51. The two tines 51 of each pair merge at their leading root ends into helical coils and those helical coils are integrally interconnected by a substantially hairpin-shaped fastening portion that is secured to the support plate 50 concerned by one of the aforementioned bolts. It will be seen from FIGS. 3 and 4 of the drawings that the effective substantially straight portions of the tines 51 extend substantially horizontally rearwards, with respect to the direction A, from the corresponding helical coils with the two pairs of tines 51 of each member 49 arranged in rearwardly convergent relationship. In each member 49, the rearmost ends of the two longer tines 51 are disposed in very close proximity to one another as are also the rearmost ends of the two shorter tines 51. The effective portions of all of the tines 51 are located immediately above the tops of the cultivating tools 11 and the rearmost free ends of the longer tines 51 of each member 49 substantially coincide, as seen in plan view (FIG. 3), with a plane containing the longitudinal axes of all six of the shafts 6.

In the use of the implement that has been described with reference to FIGS. 1 and 2 of the accompanying drawings or with reference to that embodiment as modified by FIGS. 3 and 4 of those drawings, a coupling member or trestle 53 that is of generally triangular configuration when viewed in front or rear elevation is connected to the upper and lower lifting links of a three-point lifting device or hitch at the rear of an agricultural tractor or other operating vehicle and the rotary input shaft 19 of the central gear box 18 is placed in driven connection with the power take-off shaft of the same tractor or other vehicle through the intermediary of the aforementioned telescopic transmission shaft having universal joints at its opposite ends. Upon driving the rotary input shaft 19, the six shafts 6 and the corresponding soil working or cultivating members 14 will be caused to revolve around the axes of those shafts 6 in the directions that are indicated by arrows in FIG. 1 of the drawings due to the substantially horizontal driving shaft that has been discussed above and the transmission members that are contained in the gear boxes 18 and 5. During the positive rotation of the members 14 about the axes of the shafts 6, the cultivating tools 11 will simultaneously revolve in a more or less regular manner around the axes of the corresponding stub shafts 8 in the directions that are indicated for only three of the tools 11 in FIG. 1 of the drawings. A more or less regular ground-driven rotation of the tools 11 is produced as result of the contact of the soil working portions of the tines 10 with the ground but it will be appreciated that, should one or more of the soil working tine portions meet an embedded stone or other substantially immovable obstacle, the rotation of the tool 11 concerned may be temporarily halted or even be momentarily reversed in direction. The free rotatability of the tools 11 considerably reduces the likelihood of breakage of, or serious damage to, the tines 10 upon meeting more or less immovable obstacles in the soil since, generally speaking, the tines 10 are capable of circumnavigating such obstacles unless they are considerably greater in size than is usual in previously worked agricultural land. The axes about which the tools 11 are freely rotatable are parallel to the axes of the shafts 6 about which the members 14 are positively rotated. The support 35 that is arranged in front of the supporting frame 1 with respect to the direction A is set in such a position (by appropriate upward or downward adjustment of the arms 31 about the axis defined by the stub shafts 30) that parts of the lower edges of the elongated elements 39 will be drawn through the soil surface (see FIG. 2), said elements 39 thus constituting means for cultivating soil. The general plane of each element 39 is substantially vertically disposed and is substantially parallel to the direction A and, with this construction and arrangement, a broad strip of land that substantially coincides with the strip of land that is worked by the six members 14 is preliminarily worked by the immediately foregoing elements 39. The elements 39 are formed from spring steel or from some other strip-shaped sheet material of more or less equivalent resilience and this enables them to deflect to avoid any obstacles that they may meet and to move through the soil in a somewhat vibratory manner, it being understood that the resistance to their progress through the soil that they will meet varies continuously and irregularly. The rearmost ends of the elements 39 with respect to the direction A are disposed so close to the circular paths of movement of the cultivating tools 11 that they are within the effective working area of those tools and the elements 39 thus act as means to counter act excessive, and therefore undesirable, lateral displacement of soil by the tools 11. Soil displaced forwardly with respect to the direction A by the the tools 11 of the members 14 is engaged between the elements 39 and is gradually released rearwardly as the operative progress of the implement continues.

If the lowermost edges of the elements 39 are formed as cutting edges, this makes them particularly suitable for employment with the implement in the cultivation of land that is heavily infested with weeds. The downward and rearward inclination of the elements 39 with respect to the direction A greatly facilitates the rapid shedding by those elements of any weed portions or other agricultural debris that may be picked up by the elements during forward progress in the direction A. In addition to the resilient construction of the elements 39 that allows them to deflect laterally to avoid stones or other obstacles, it will be remembered that the support 35, together with all of the elements 39, is upwardly and downwardly displaceable, against the resilient opposition of the springs 44, about the axis defined by the stub shafts 34 and this upward and downward yielability also enables the elements 39 to avoid damage. The nuts 45 can be adjusted lengthwise along the rods 42, as may be required, to increase or decrease the pressure by which the lower edges of the elements 39 bear penetratingly against the soil surface.

During operation of the implement, an intensive co-operation exists between the effective portions of the resilient soil crumbling members 48 or 49 and the immediately unerlying freely rotatable cultivating tools 11 of the positively rotated soil working or cultivating members 14. This co-operation ensures that the worked soil becomes finely divided ant the described and illustrated shaping of the rearmost ends of the members 48 ensures that the finely crumbled soil is satisfactorily conducted away from the crumbling area, choking by weeds and- /or jamming by stones or the like being extremely uncommon because of the resilient construction of the members 48. In the case of the members 49 of FIGS. 3 and 4 of the drawings, the resilient construction and arrangement of their tines 51, combined with the circular cross-section of the spring steel or other resilient material from which the tines are made is equally effective in conducting the crumbled soil away from the crumbling area and in making choking by weeds and/or jamming by stones a very infrequent occurrence.

The level of the axis of rotation of the ground roller 26 that is appointed relative to the level of the supporting frame 1 by choosing appropriate holes 23 for co-operation with the bolts 22 is a principal factor in determining maximum depth of penetration of the tines 10 into the soil which is possible during the operation of the implement and, generally speaking, this adjustment is made at the commencement of a cultivating operation before the previously described adjustment of the positions of the elongated elements 39 is undertaken. It will be noted from FIG. 1 of the drawings that the second, fourth and sixth support plates 28 of the roller 26, counting from either end of the roller, are in substantial register, in the direction A, with the regions of overlap between three corresponding pairs of the members 14 in which parts of the two members 14 of each such pair move rearwardly with respect to the direction A through the regions of overlap towards the roller 26 when the implement is in operation. Generally speaking, it is in these three regions that a preponderance of the soil displaced by the six members 14 will be delivered so that there is some tendency for the crumbled soil to be formed into ridges that extend parallel to the direction A in register with the three regions of overlap that have just been discussed. Such ridging is greatly minimised, if not entirely eliminated, by the fact that the sharp angular bends or kinks in the elongated elements 29 of each of the three groups of those elements coincide with the second, fourth and sixth support plates 28 of the roller 26 so that said elements tend to spread soil laterally away from the sharp angular bends or kinks that are formed substantially midway therealong thus distributing any earth ridges that may have been formed more or less uniformly throughout the whole working width of the implement.

Figure 5:
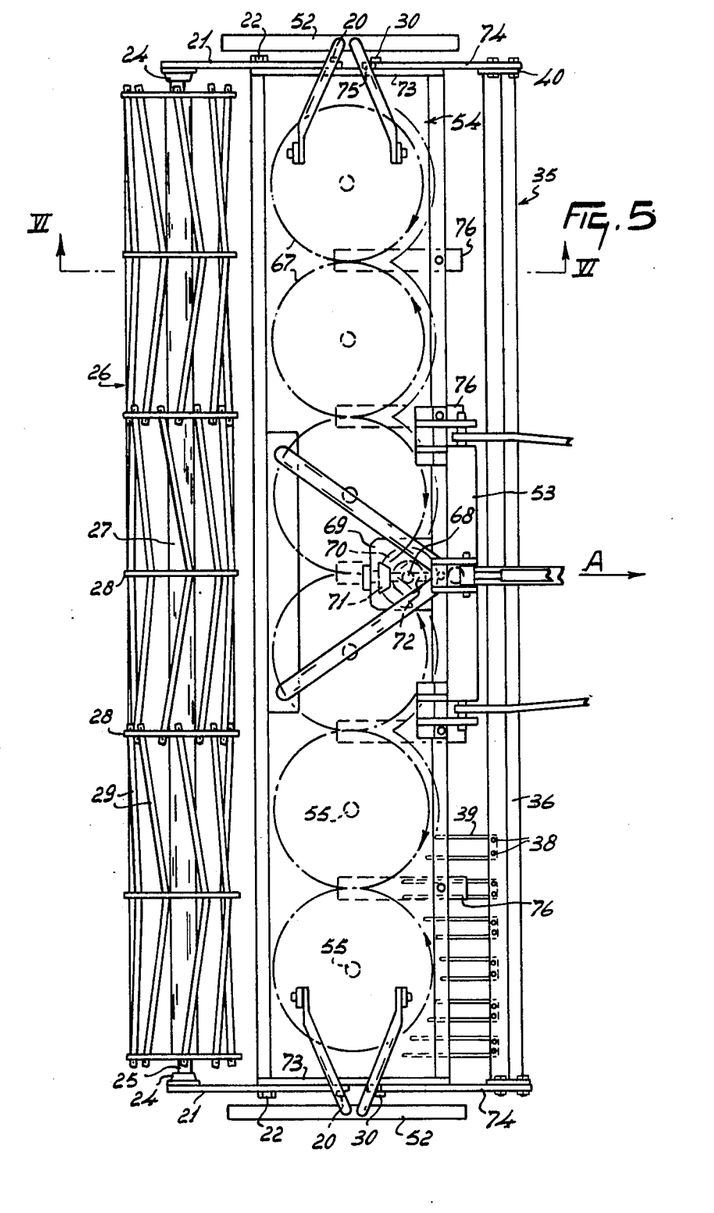
FIG. 5 is a plan view of an alternative form of soil cultivating implement in accordance with the invention shown connected to the three-point lifting device or hitch of an agricultural tractor or other operating vehicle.
Figure 6:
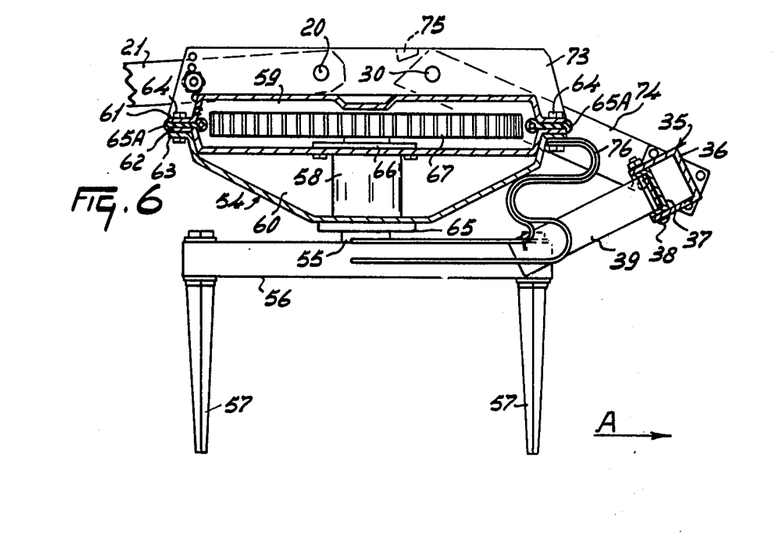
FIG. 6 is a section, to an enlarged scale, taken on the line VI—VI in FIG. 5.

FIGS. 5 and 6 of the drawings illustrate an alternative form of soil cultivating implement in accordance with the invention which implement includes a number of parts that are similar, or identical, to parts of the two embodiments that have already been described with reference to FIGS. 1 to 4 of the accompanying drawings. Such parts are indicated in FIGS. 5 and 6 of the drawings by the same references as are used for the corresponding parts in FIGS. 1 to 4 and will not be described again in detail. The implement of FIGS. 5 and 6 has a frame in the form of a hollow frame portion 54 that extends substantially horizontally transverse, and usually substantially horizontally perpendicular, to the intended direction of operative travel of the implement that is again indicated by an arrow A. Six upwardly extending shafts 55 that will usually be vertically or substantially vertically disposed are rotatably mounted in the hollow frame portion 54 in such a way that their longitudinal axes (axes of rotation) are spaced apart from one another by distances of substantially 50 centimeters. The lowermost end of each shaft 55 projects from beneath the bottom of the hollow frame portion 54 and is there provided with a corresponding tined soil working or cultivating member 56. Each member 56 comprises two diametrically opposed rigid soil working tines 57 and each shaft 55 is rotatably supported in a lower trough 60 of the hollow frame portion 54 by bearings located in a corresponding bearing housing 58 which it is not necessary to describe nor illustrate in detail for the purposes of the present invention. The hollow frame portion 54 is made from sheet steel and comprises, in addition to the lower trough 60, an upper chamber 59. The longitudinal axes of the chamber 59 and trough 60 extend substantially horizontally perpendicular to the direction A and are in parallel relationship with one another. The chamber 59 is of substantially rectangular cross-section whereas the underlying trough 60, when considered together with a lower wall of the chamber 59, is of substantially inverted trapezoidal cross-section. The chamber 59 has upper and lower walls that are both formed from sheet steel, the upper wall comprising a substantially horizontal portion that has obliquely downwardly divergent front and rear edges of symmetrically identical construction. Each of said front and rear edges is provided with a horizontally bent-over clamping rim 61 that extends throughout the length (transverse to the direction A) of the edge of the wall concerned. The lower wall is of inverted substantially symmetrically identical construction to the upper wall and thus comprises a substantially horizontal portion flanked by upwardly obliquely divergent front and rear edges that are both formed with horizontally bent-over clamping rims 62 that, like the rims 61, extend throughout the transverse lengths of the front and rear edges of the lower wall. With this substantially symmetrically identical construction of the upper and lower walls, the rims 61 of the upper wall are spaced from the horizontal portion thereof by substantially the same distance as are the rims 62 from the substantially horizontal portion of the lower wall. The trough 60 has a substantially horizontally disposed central portion or base that is relatively narrow in the direction A, said central portion being a portion of a sheet metal wall of the trough which is bent over at the front and rear edges so as to form further symmetrically disposed upwardly divergent portion. The upper edges of these divergent portions are, in turn, bent over to form further less steeply divergent portions which bear against the outer surfaces of the upwardly divergent front and rear edges of the lower wall of the chamber 59, said less steeply divergent portions terminating in horizontally bent-over clamping rims 63 whose upper surfaces abut against the lower surfaces of the clamping rims 62 at the front and rear edges of the lower wall of the chamber 59. The clamping rims 61 and 62 of the upper and lower walls of the chamber 59 are secured to one another by vertically disposed bolts 64 with the interposition of a gasket 65A formed from a hard synthetic plastics material. The gasket 65A is strip-shaped and its opposite edges are formed with inner and outer rims of different shapes. The inner rims are of hollow tubular configuration and lie between the upwardly and downwardly inclined edges of the upper and lower walls of the chamber 59 whereas the outer rims are of solid formation and lie against the outermost extremities of the superposed clamping rims 61 and 62, the outer rim of the gasket 65A having a substantially flat inner surface which sealingly engages said extremities and a curved outwardly directed surface. The clamping rim 63 of the trough 60 forms a support for the upper chamber 59 and can, if desired, be releasably secured to the superposed clamping rims 61 and 62 of the upper and lower walls of the chamber 59 by further bolts (not illustrated) that are arranged in alternate relationship with the bolts 64 under which circumstances such further bolts can be released to allow the removal of the trough 60 without having to loosen the bolts 64 and break the gasketed seal between the clamping rims 61 and 62 of the chamber 59.

The lower wall of the upper chamber 59 and the base of the trough 60 are formed with vertically registering circular holes that are spaced apart from one another at regular distances of substantially 50 centimeters. These holes receive the bearing housings 58 for the shafts of the corresponding soil working or cultivating members 56. Each bearing housing 58 has a flange 65 at its lowermost end and the upper surface of this flange engages the lower surface of the base of the trough 60, vertically disposed bolts being provided to secure the flange 65 to the base of the trough 60. The upper end of each bearing housing 58 comprises a portion of reduced diameter and extends through the corresponding hole in the lower wall of the chamber 59 into the interior of that chamber. The portion of reduced diameter co-operates with a corresponding ring 66 that is bolted to the lower wall of the chamber 59 so as to lie principally on the upper surface of that wall in surrounding relationship with the hole therein. In fact, each ring 66 has a rim that extends into the corresponding hole in the lower wall of the chamber 59 said rim and/or the registering portion of the bearing housing 58 concerned being provided with at least one sealing ring so as substantially to prevent lubricant contained within the chamber 59 from penetrating downwardly into the trough 60. The upper end of each shaft 55 is located inside the chamber 59 and is there provided with a straight- or spur-toothed pinion 67, the six pinions 67 being so arranged that the teeth of each of them are in mesh with the teeth of the or each neighbouring pinion 67 of the row.

A gear box 69 is mounted substantially centrally across the width of the frame portion 54 at the top and front thereof with respect to the direction A. The gear box 69 is provided with a substantially horizontally disposed rotary input shaft 72 whose leading splined or otherwise keyed end projects forwardly from the front of the gear box in substantially the direction A for driven connection with the power take-off shaft of an agricultural tractor or other operating vehicle with the aid of an intermediate telescopic transmission shaft (not shown in detail) that is of a construction which is known per se having universal joints at its opposite ends. The input shaft 72 carries, inside the gear box 69, a bevel pinion 71 whose teeth are in driving mesh with those of a larger bevel pinion 70. The bevel pinion 70 is secured to the uppermost end of a substantially vertically disposed splined shaft 68 which is provided, throughout most of its length, with the hub of internally splined straight- or spur-toothed pinion of much smaller size than the pinions 67. Upper and lower ends of the hub of the small pinion that has just been mentioned, and thus the shaft 68, are rotatably supported by axially aligned and vertically spaced apart ball bearings, said bearings being arranged in lower and upper bearing housings, respectively, which housings are arranged in openings in the lower and upper walls of the chamber 59. The lower bearing housing is also partly located in an opening in the leading upwardly divergent portion of the wall of the trough 60. The top of the upper bearing housing is located inside a lower region of the gear box 69.

The opposite ends of the hollow frame portion 54 are closed by side plates 73 that extend substantially vertically parallel to one another and to the direction A, said side plates 73 being equivalent to the previously described side plates 3 even though they are somewhat different in shape and extent to those side plates 3. Thus, they have the roller 26 that affords a rotatable supporting member of the implement connected to them by the arms 21 so as to be upwardly and downwardly adjustable in level relative to the frame portion 54 and also have the support 35 connected to them by arms 74. The arms 74, like the previously described arms 31, are upwardly and downwardly pivotable about the axis defined by the stub shafts 30 but, in this case, the support 35 is not turnably connected to the arms 74 and upward and downward displaceability is provided by allowing said arms 74 to turn upwardly and downwardly about the axis defined by the stub shafts 30 freely but within limits. Excessive downward displacement of the support 35 and the elements 39 which it carries is prevented by abutment of the leading ends of the arms 74 against stops 75 (FIG. 6).

In this embodiment, soil crumbling members 76 are connected to the front of the hollow frame portion 54, with respect to the direction A, at locations that are midway between planes which extend parallel to the direction A and which contain the axes of rotation of the shafts 55. Each soil crumbling member 76 is made from spring steel or other resilient material in strip-shaped form and it will be seen from FIG. 6 of the drawings that the members 76 are provided in pairs which extend away from the locations at which they are secured to the frame portion 54 by appropriately positioned ones of the previously mentioned bolts 64 in a substantially S-shaped configuration as seen in side elevation (FIG. 6). The S-shaped parts of the members 76 of each pair bear against one another and abut against a front portion of the trough 60. At the lowermost ends of the S-shaped parts of the two members 76 of each pair, those two members become spaced from one another and extend, by way of substantially 180° bends, into effective portions that are substantially horizontally disposed in vertically spaced apart relationship, each effective portion being rectilinearly parallel to the direction A. It can be seen from both FIGS. 5 and 6 of the drawings that both the upper and lower soil crumbling members 76 of each pair have the rearmost ends of their lower effective portions disposed rearwardly just beyond, and thus substantially in register with, a plane that containes the longitudinal axes of all six of the shafts 55.

Figure 7:
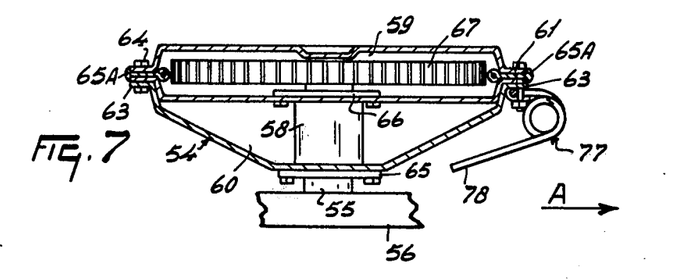
FIG. 7 is similar to FIG. 6 but illustrates the provision of alternative members for the implement of FIG. 5.
Figure 8:
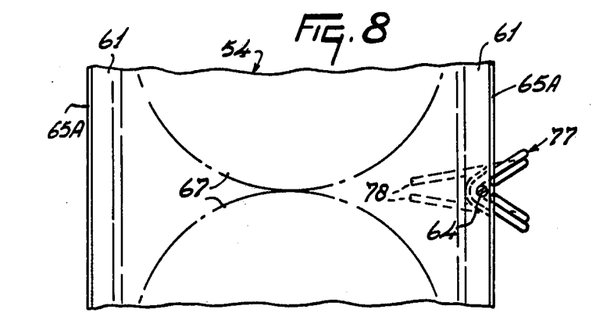
FIG. 8 is a plan view of the construction illustrated in FIG. 7.

FIGS. 7 and 8 of the drawings illustrate an implement that is identical to the implement to FIGS. 5 and 6 except that the soil crumbling members 76 are replaced by soil crumbling members 77 in the form of pairs of tines 78 that are formed from spring steel rod or other material of substantially equivalent resilience, the spring steel rod or other material being of circular cross-section. The two tines 78 of each member 77 are formed integrally and comprise helical coils interconnected by a substantially hair-pin-shaped fastening portion which is secured to the hollow frame portion 54, at the front thereof with respect to the direction A, by a vertically disposed bolt that takes the place of one of the bolts 64, said replacing bolt being of greater length than the bolts 64. Each tine 78 has a substantially straight effective portion which is inclined downwardly and rearwardly away from its integral connection to the corresponding coil. The downward inclination is such that, as can be seen in FIG. 7 of the drawings, each such portion is in substantially parallel relationship with that portion of the front wall of the trough 60 which immediately adjoins the flat base thereof. The rearmost free ends of the tines 78 are disposed substantially midway between a plane containing the longitudinal axes of all six of the shafts 55 and a parallel plane containing the leading edge of the trough 60.

In the use of the soil cultivating implement that has been described with reference in FIGS. 5 and 6 of the drawings, with or without the modification that has been described with reference to FIGS. 7 and 8 thereof, the six soil working or cultivating members 56 are positively rotated in the directions that are indicated by arrows in FIG. 5 by the drive that is derived from the power take-off shaft of the agricultural tractor or other vehicle which moves and operates the implement. The tines 57 of the members 56 are arranged to work overlapping strips of soil so that, in effect, the implement works a single broad strip of land. Once again, the resilient elongated elements 39 work the soil immediately in advance of the members 56 throughout the working width of those members and co-operate with them in greatly reducing, if not substantially completely preventing, undesired lateral displacement of the soil that is moved by the tines 57 of the members 56. The soil crumbling members 76 of FIGS. 5 and 6 of the drawings, or the soil crumbling members 77 of FIGS. 7 and 8 of the drawings, co-operate with the tops of the soil working or cultivating members 56 and bring the soil displaced by those members to a well crumbled condition. In the case of the soil crumbling members 76 that are illustrated in FIGS. 5 and 6 of the drawings, those members 76 are provided in pairs in which the two members of each pair abut against one another throughout initial portions of their lengths commencing from their fastening points. This construction and arrangement gives the spaced effective portions of the two members 76 of each pair a somewhat greater stiffness than would otherwise be obtained and this, particularly when heavy soil is being worked, results in an improved co-operation between the effective portions of the members 76 and the tops of the soil working or cultivating members 56. The effective portions of both the soil crumbling members 76 and 77 are of resilient construction and mounting and are thus capable of deflecting readily in the event of impacts against stones and the like thus making damage to them from such causes a very infrequent occurrence.

Although various features of the soil cultivating implements that have been described and/or that are illustrated in the accompanying drawings will be set forth in the following claims as inventive features, it is emphasised that the invention is not necessarily limited to such features and that it includes within its scope each of the parts of each soil cultivating implement that have been described, and/or that are illustrated in the accompanying drawings, both individually and in different combinations.

What we claim is:

1. A soil cultivating implement comprising a frame and a plurality of rotatable soil cultivating members arranged in a transverse row and said members journalled along the length of an elongated portion of said frame, said frame portion extending transverse to the direction of travel and said cultivating members being mounted on corresponding upwardly extending shafts supported on said frame portion, driving means connected to rotate said members about axes defined by said shafts, neighboring soil cultivating members being rotated in relative opposite directions by said driving means, each member comprising a substantially horizontal support with tines mounted adjacent the lower end of a respective shaft and tines depending from said support, a transverse row of elongated elements positioned across the working width of the implement and being attached to said frame in advance of said cultivating members, front ends of said elements being attached to support means and said elements extending rearwardly and downwardly, side-by-side to lower soil working rear ends, said rear ends being located adjacent the paths of said cultivating members on circles which are substantially coaxial with the rotary axes of those members and said rear ends being normally positioned at a level substantially above the lower tips of said tines.

2. An implement as claimed in claim 1, wherein each element is a strip and is arranged with the width of said strip extending in a non-horizontal direction.

3. An implement as claimed in claim 1, wherein each element extends substantially parallel to the direction of travel.

4. An implement as claimed in claim 3, wherein said elements are arranged in spaced apart side-by-side relationship.

5. A soil cultivating implement comprising a frame and a plurality of rotatable soil cultivating members arranged in a transverse row with respect to the direction of implement travel, said members being journalled along the length of an elongated transverse portion of said frame, said cultivating members being mounted on corresponding upwardly extending shafts supported on said frame portion, driving means connected to rotate said members about axes defined by said shafts and neighboring soil cultivating members in relative opposite directions, such cultivating member comprising a support mounted on a respective shaft and downwardly extending tines secured to said support, a transverse row of elongated and rearwardly extending soil working elements being connected to said implement in front of said frame portion, said elements being positioned in advance of the soil cultivating members and between neighboring cultivating members, said elements extending downwardly and rearwardly to counter the lateral displacement of soil by the rotating members and work the ground closely adjacent the paths described by said tines, shorter elements being located substantially in register with the axes of rotation of the soil cultivating members and other longer elements being located substantially in register with points about midway between the axes of rotation of the cultivating members, further elements being positioned between the shorter and longer elements and said further elements having progressively increasing intermediate lengths.

6. A soil cultivating implement comprising a frame and a plurality of rotatable soil cultivating members arranged in a transverse row with respect to the direction of implement travel, said members being journalled along the length of an elongated transverse portion of said frame, said cultivating members being mounted on corresponding upwardly extending shafts supported on said frame portion, driving means connected to rotate said members about axes defined by said shafts and neighboring soil cultivating members in relative opposite directions, each cultivating member comprising a support mounted on a respective shaft and downwardly extending tines secured to said support, a transverse row of elongated and rearwardly extending soil working elements being connected to said implement in front of said frame portion, said elements being positioned in advance of the soil cultivating members and between neighboring cultivating members, said elements extending downwardly and rearwardly to counter the lateral displacement of soil by the rotating members and work the ground closely adjacent the paths described by said tines, free ends of said elements being located on substantially circular lines whose centers of curvature substantially coincide with the exes of rotation of respective cultivating members.

7. An implement as claimed in claim 6, wherein said elements are in longer and shorter pairs, the two elements of each longer pair being positioned closer to one another than are the two elements of each shorter pair.

8. A soil cultivating implement comprising a frame and a plurality of rotatable soil cultivating members arranged in a transverse row with respect to the direction of implement travel, said members being journalled along the length of an elongated transverse portion of said frame, said cultivating members being mounted on corresponding upwardly extending shafts supported on said frame portion, driving means connected to rotate said members about axes defined by said shafts and neighboring soil cultivating members in relative opposite directions, said cultivating member comprising a support mounted on a respective shaft and downwardly extending tines secured to said support, a transverse row of elongated and rearwardly extending soil working elements being connected to said implement in front of said frame portion, said elements being positioned in advance of the soil cultivating members and between neighboring cultivating members, said elements extending downwardly and rearwardly to counter the lateral displacement of soil by the rotating members and work the ground closely adjacent the paths described by said tines, said elements being mounted on a common support that extends transverse to the direction of travel, said common support being vertically displaceable relative to the frame portion and held between two arms pivoted to said frame, said common support being pivotable about its longitudinal axis with respect to said arms.

9. A soil cultivating implement as claimed in claim 8, wherein said elements are resilient strips and the widths of said strips extend substantially vertically and substantially parallel to the direction of travel, the free ends of said strips being rectangular in shape.

10. A soil cultivating implement comprising a frame and a plurality of rotatable soil cultivating members arranged in a transverse row with respect to the direction of implement travel, said members being journalled along the length of an elongated transverse portion of said frame, said cultivating members being mounted on corresponding upwardly extending shafts supported on said frame portion, driving means connected to rotate said members about axes defined by said shafts and neighboring soil cultivating members in relative opposite directions, each cultivating member comprising a support mounted on a respective shaft and downwardly extending tines secured to said support, a transverse row of elongated and rearwardly extending soil working elements being connected to said implement in front of said frame portion, said elements being positioned in advance of the soil cultivating members and between neighboring cultivating members, said elements extending downwardly and rearwardly to counter the lateral displacement of soil by the rotating members and work the ground closely adjacent the paths described by said tines, said elements being mounted on a common support that is pivotable against resilient opposition and a spring mechanism being positioned between the support and a pivot arm for said support adjacent one end thereof, said spring mechanism comprising springs mounted on a rod on each side of an eyelet, said rod being passed through said eyelet and interconnected to said common support.

11. A soil cultivating implement comprising a frame nd a plurality of rotatable soil cultivating members arranged in a transverse row with respect to the direction of implement travel, said members being journalled along the length of an elongated transverse portion of said frame, said cultivating members being mounted on corresponding upwardly extending shafts supported on said frame portion, driving means connected to rotate said members about axes defined by said shafts and neighboring soil cultivating members in relative opposite directions, each cultivating member comprising a support mounted on a respective shaft and downwardly extending tines secured to said support, a transverse row of elongated and rearwardly extending soil working elements being connected to said implement in front of said frame portion, said elements being positioned in advance of the soil cultivating members and between neighboring cultivating members, said elements extending downwardly and rearwardly to counter the lateral displacement of soil by the rotating members and work the ground closely adjacent the paths described by said tines, said elements being mounted on a common support which comprises two channel-section beams, the limbs of one beam being shorter than the limbs of the other beam, said first mentioned beam being located inside said other beam and said elements being secured between the limbs of the beams by bolts, that also fix the channel-section beams relative to one another.

* * * * *